F. CONRAD.
CURRENT RECTIFYING APPARATUS.
APPLICATION FILED JAN. 10, 1912.
1,112,265.
Patented Sept. 29, 1914.
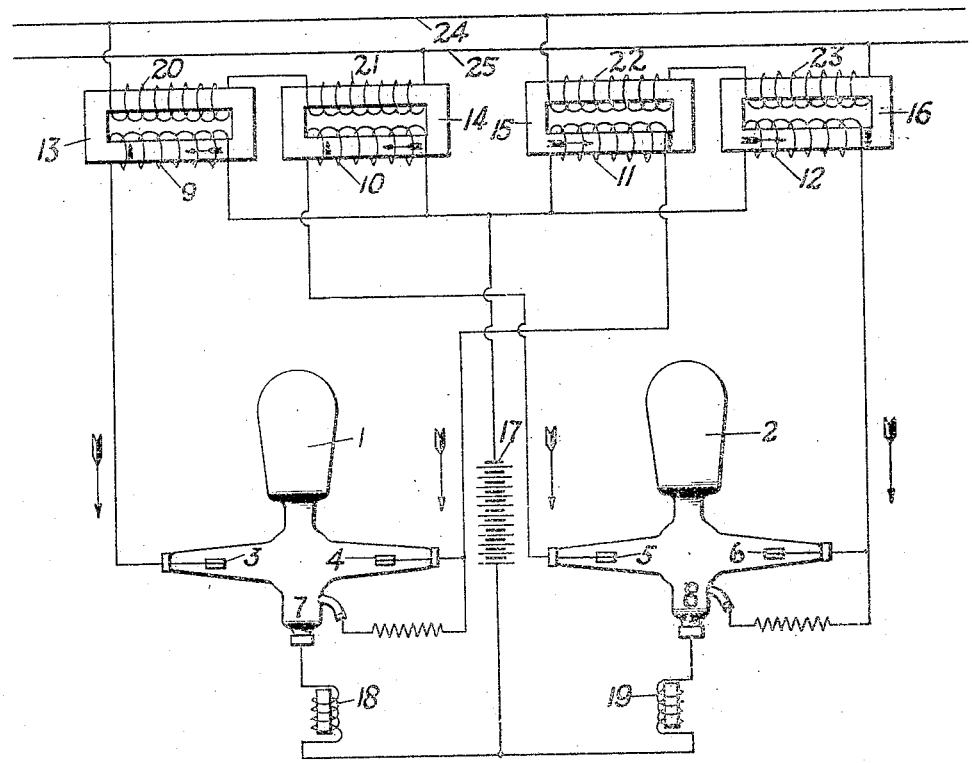

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

CURRENT-RECTIFYING APPARATUS.

1,112,265.  Specification of Letters Patent.  Patented Sept. 29, 1914.

Application filed January 10, 1912. Serial No. 670,523.

*To all whom it may concern:*

Be it known that I, FRANK CONRAD, a citizen of the United States, and a resident of Swissvale, in the county of Allegheny and State of Pennsylvania, have invented a new and useful Improvement in Current-Rectifying Apparatus, of which the following is a specification.

My invention relates to current-rectifying apparatus, and it has for its object to provide means whereby the current following a short circuit in a vapor or other suitable current rectifier will be limited to a comparatively small value, the evil effects of short circuits being thereby substantially eliminated, and the occurrence of the short circuits themselves being substantially prevented.

My invention consists in so arranging the transformer windings through which current is supplied to the rectifying apparatus that the transformers may serve as current-limiting means upon the occurrence of a short circuit.

The single figure of the accompanying drawing diagrammatically illustrates a rectifier system embodying my invention.

Two mercury-vapor or other suitable current-rectifying devices 1 and 2, having anodes 3—4 and 5—6, respectively, and mercury or other suitable vaporizable cathodes 7 and 8, respectively, are supplied with alternating current through the secondary windings 9, 10, 11 and 12, of transformers 13, 14, 15 and 16, respectively. One terminal of each of the secondary windings is connected to one terminal of a battery 17, or any other suitable receiver of direct current, the other terminal of which is connected to the cathodes 7 and 8 of the rectifiers, suitable inductive devices 18 and 19, respectively, being included in the said connections, for the purpose of sustaining the rectified currents. The remaining terminals of the secondary windings of the transformers are severally connected to the anodes of the rectifiers, the windings 9 and 11 being connected respectively to the anodes 3 and 4 of the rectifier 1, and the windings 10 and 12, respectively, being connected to the anodes 5 and 6 of the rectifier 2. The primary windings 20, 21, 22 and 23, respectively, of the transformers are connected in series in pairs, the windings 20 and 21 constituting one pair, and the windings 22 and 23 constituting the other pair. The primary windings receive current from any suitable supply circuit 24—25.

In the normal operation of the system, alternate half-waves of the alternating current are supplied to the rectifiers by way of the anodes 3 and 5, the circuits being completed through the battery 17. The other alternate half-waves are supplied to the rectifiers through secondary windings 11 and 12 of the transformers, and enter the rectifiers by way of the anodes 4 and 6, respectively. If a short circuit occurs in one of the rectifiers, the short circuit current will traverse the secondary windings of two of the transformers belonging to different pairs, with the result that a large amount of impedance is introduced into the path of the short circuit current, thereby materially limiting the same. This will be best understood by considering, for example, that a short circuit occurs in the rectifier 1 between the anodes 3 and 4, in which case the short circuit current will traverse the transformer windings 9 and 11. If, at the same time, the rectifier 2 continues to operate normally, the windings 10 and 12 will alternately be inactive, with the result that the primary windings 21 and 23 of the transformers 14 and 16 alternately serve as impedance devices that are included in circuit with the primary windings 20 and 22 of the transformers 13 and 15, which induce the short circuit current in the secondary windings 9 and 11. The primary current is thus materially limited, and the short circuit is also correspondingly limited. The limitation of the short circuit current prevents injury to the rectifier and also substantially prevents the occurrence of the short circuits themselves.

It will, of course, be understood that if a short circuit occurs in the rectifier 2, the current will be limited in a similar manner. As the possibility of the simultaneous short circuiting of both the rectifiers is extremely remote, the protection afforded by the present system of connections is effective and reliable.

I claim as my invention:

1. The combination with two rectifying devices, of four transformers the primary windings of which are connected in series in pairs, and the secondary windings of which have a common connection to the cathodes of the rectifiers and other connections respectively to the anodes of the rectifiers, the anodes of each rectifier being respectively connected to secondary windings of transformers belonging to different pairs.

2. The combination with two rectifying devices, of four transformers, the primary windings of which are connected in series in pairs, and the secondary windings of which have a common connection to the cathodes of the rectifiers and other connections respectively to the anodes of the rectifiers.

3. The combination with two rectifying devices, each having two anodes and a cathode, of four transformers having primary windings connected in series in pairs and secondary windings, a terminal of each of which is connected to the cathodes of the rectifiers and the remaining terminals of which are respectively connected to the anodes of the rectifiers, the anodes of each rectifier being respectively connected to the secondary windings of transformers belonging to different pairs.

4. The combination with a supply circuit and current-rectifying apparatus, of transforming apparatus interposed between the circuit and the current-rectifying apparatus, and connections between the current-rectifying apparatus and the transforming apparatus whereby the latter normally offers comparatively little opposition to the flow of current to the rectifying apparatus, and whereby, upon the occurrence of a short circuit, it offers a large amount of opposition to the flow of current.

5. The combination with a supply circuit and two multi-anode rectifiers, the transformers having primary and secondary windings, and connections whereby the anodes of the rectifiers are supplied from the transformer secondary windings, and the secondary winding of each transformer is rendered inactive during alternate half wave cycles of the current, and also whereby short circuit current between two anodes of a rectifier is limited in value by the high reactance of inactive secondary windings.

6. The combination with transforming apparatus comprising four sets of primary and secondary windings, and magnetizable core parts whereby the windings of each set are inductively more closely related to each other than to the windings of other sets, of current-rectifying apparatus supplied from the said secondary windings.

7. The combination with two rectifying devices, of a plurality of transformers having four secondary windings to which the anodes of the rectifying devices are respectively connected.

8. The combination with a plurality of transformers having their primary windings connected in series in pairs, of current rectifying apparatus supplied from the secondary windings of the transformers.

9. The combination with a plurality of transformers having substantially independent magnetic circuits and having their primary windings connected in series in pairs, of current rectifying apparatus supplied from the secondary windings of the transformers.

10. The combination with transforming apparatus comprising four sets of primary and secondary windings, the primary windings of which are connected in series in pairs, and magnetizable core parts whereby the windings of each set are inductively more closely related to each other than to the windings of other sets, of current-rectifying apparatus supplied from the said secondary windings.

In testimony whereof, I have hereunto subscribed my name this 23rd day of Dec. 1911.

FRANK CONRAD.

Witnesses:
 YASUDIRO SAKAI,
 R B. HINES.